(12) United States Patent  (10) Patent No.: US 8,872,838 B2
Schneider et al.  (45) Date of Patent: Oct. 28, 2014

(54) PRIMITIVE COMPOSITION

(75) Inventors: Gerhard Schneider, Seattle, WA (US); Bede Jordan, Seattle, WA (US); Ashraf Michail, Redmond, WA (US); Brendan J. Clark, Seattle, WA (US); Pawel Wiktor Olszta, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 13/229,342

(22) Filed: Sep. 9, 2011

(65) Prior Publication Data

US 2013/0063459 A1  Mar. 14, 2013

(51) Int. Cl.
  *G09G 5/00*  (2006.01)
(52) U.S. Cl.
  CPC ........................................ *G09G 5/00* (2013.01)
  USPC .......................................................... 345/581
(58) Field of Classification Search
  CPC .............. G06T 2200/04; G06T 15/005; G06T 2210/61
  USPC .......... 345/473, 553, 581, 619; 715/760, 762, 715/763
  See application file for complete search history.

(56) References Cited

U.S. PATENT DOCUMENTS

| | | | |
|---|---|---|---|
| 6,091,422 A | 7/2000 | Ouaknine et al. | |
| 7,088,374 B2 * | 8/2006 | David et al. | 345/619 |
| 8,130,239 B1 * | 3/2012 | Garrity | 345/619 |
| 8,368,705 B2 * | 2/2013 | Green et al. | 345/522 |
| 2009/0141034 A1 | 6/2009 | Pryor et al. | |
| 2009/0225079 A1 | 9/2009 | Schechter et al. | |
| 2009/0322769 A1 | 12/2009 | Zhou et al. | |
| 2010/0013854 A1 | 1/2010 | Michail | |
| 2010/0026700 A1 | 2/2010 | Michail et al. | |
| 2011/0057937 A1 | 3/2011 | Wu et al. | |

OTHER PUBLICATIONS

Lefohn, et al., "Glift: Generic, Efficient, Random-Access GPU Data Structures", In Proceedings of ACM Transactions on Graphics, vol. 25, Issue 1, Jan. 2006, pp. 1-37.
Owens, et al., "GPU Computing", In Proceedings of the IEEE, vol. 96, Issue 5, May 2008, pp. 879-899.
Breitbart, Jens, "Data Structure Design for GPU Based Heterogeneous Systems", In International Conference on High Performance Computing & Simulation, Jun. 21-24, 2009, pp. 44-51.
Mortensen, et al., "Light Field Propagation and Rendering on the GPU", In Proceedings of the 5th international Conference on Computer Graphics, Virtual Reality, Visualisation and Interaction in Africa, Oct. 29-31, 2007, pp. 15-23.

* cited by examiner

*Primary Examiner* — Hau Nguyen
*Assistant Examiner* — Ryan M Gray
(74) *Attorney, Agent, or Firm* — Tony Azure; Ramesh Kuchibhatla; Micky Minhas

(57) ABSTRACT

Performing primitive composition within a user interface thread, enhancing the ability to scale a user interface framework to computing devices having limited resources. In one or more embodiments, a user interface thread walks a user interface hierarchy that describes elements of a program's user interface and directly generates static Graphics Processing Unit (GPU) data structures representing at least a portion of the user interface hierarchy. The user interface thread passes the static GPU data structures to a composition thread, which uses these static GPU data structures during generation of a plurality of video frames. This includes the composition thread, based on the static GPU data structures, sending GPU data and GPU commands for the plurality of video frames to a GPU for rendering.

20 Claims, 3 Drawing Sheets

PRIMITIVE COMPOSITION

CROSS-REFERENCE TO RELATED APPLICATIONS

Not applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. Recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many applications (including both operating system-level applications and end-user applications) include graphical user interfaces for displaying information to users and for receiving user input. While most graphical user interfaces have historically been relatively simple in terms of the computing resources used when rendering user interfaces, many software developers now desire to produce increasingly complicated user interfaces to provide rich user experiences. For example, many software developers now desire to use graphical user interface elements that are difficult to render, such user interface elements that employ transparency, animations, three-dimensional graphics, and the like to create rich, responsive, and fluid user interfaces.

Recently, portable computing devices (e.g., smart phones, PDAs, portable media players, tablet computers, and the like), which have limited resources and stringent power consumption requirements, have also become increasingly popular. Some of these devices can incorporate touch-style user input, which can help make using these devices feel more intuitive. Developers who design user interfaces for these computing devices are particularly interested in maximizing the effectiveness of the user interfaces on these devices by producing rich, responsive, and fluid user interfaces. However, the limited resources and the battery life concerns that accompany these devices can make it difficult for developers to produce highly animated and graphically appealing user interfaces for these devices, while also maintaining user interface responsiveness and while rendering reliable frame rates.

BRIEF SUMMARY

Embodiments may include functionality for performing primitive composition in a user interface (UI) thread. By composing primitives, such as Graphics Processing Unit (GPU) data structures, in a UI thread, a user interface framework is able to reduce the workload of a separate composition thread responsible for processing animations, processing input, and rendering a frame. This, in turn, enhances the ability to scale the user interface framework to computing devices having relatively limited resources, such as mobile devices, tablet computers, embedded devices, etc.

For example, in one or more embodiments, a computer system performing primitive composition walks a user interface hierarchy for a program within a UI thread. The user interface hierarchy describes elements of the program's user interface. Based on walking the user interface hierarchy, the UI thread directly generates static GPU data structures representing at least a portion of the UI hierarchy. The UI thread passes these static GPU data structures to a separate composition thread, which retains the static GPU data structures for reuse during the generation of a plurality of video frames of the user interface. Thus, separately, the composition thread reuses the static GPU data structures received from the UI thread for rendering each of a plurality of video frames. This includes the composition thread deriving GPU data and GPU commands from the static GPU data structures for each of the plurality of video frames and sending the data and commands to the GPU for rendering.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
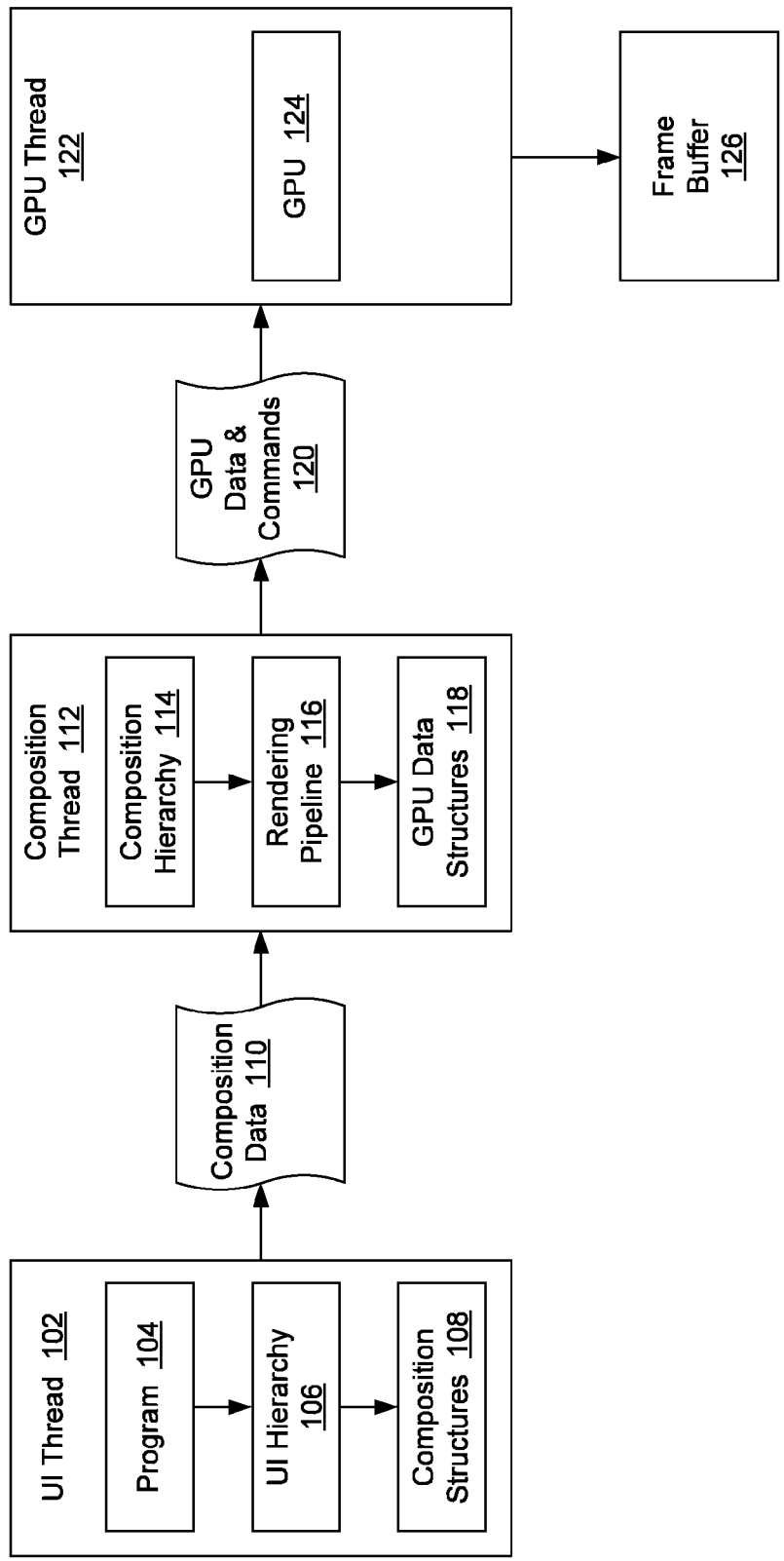
FIG. 1 illustrates an example computer architecture that uses a user interface thread and a composition thread to render a user interface.

Embodiments may include functionality for performing primitive composition in a user interface (UI) thread. By composing primitives, such as Graphics Processing Unit (GPU) data structures, in a UI thread, a user interface framework is able to reduce the workload of a separate composition thread responsible for processing animations, processing input, and rendering a frame. This, in turn, enhances the ability to scale the user interface framework to computing devices having relatively limited resources, such as mobile devices, tablet computers, embedded devices, etc.

For example, in one or more embodiments, a computer system performing primitive composition walks a user interface hierarchy for a program within a UI thread. The user interface hierarchy describes elements of the program's user interface. Based on walking the user interface hierarchy, the UI thread directly generates static GPU data structures representing at least a portion of the UI hierarchy. The UI thread passes these static GPU data structures to a separate composition thread, which retains the static GPU data structures for reuse during the generation of a plurality of video frames of the user interface. Thus, separately, the composition thread reuses the static GPU data structures received from the UI thread for rendering each of a plurality of video frames. This includes the composition thread deriving GPU data and GPU commands from the static GPU data structures for each of the plurality of video frames and sending the data and commands to the GPU for rendering.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, "netbook" computers, tablet computers, message processors, hand-held devices, multi-processor systems, microprocessor-based or programmable consumer electronics, network PCs, minicomputers, mainframe computers, mobile telephones, PDAs, media devices, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Many computer systems include computer hardware optimized for processing and rendering graphics information. For example, some computer systems include one or more GPUs optimized for processing and rendering graphics information, such as applying transformations and textures to polygons, to render a scene. GPUs typically comprise a parallel processing architecture that can process a great number of graphics-related tasks at the same time to build a scene in a framebuffer for display on a display device. To produce high quality graphics, many computer systems have become increasingly powerful and complex, at least in terms of amount of available memory, general processing capacity, and complexity of GPUs. Leveraging GPUs, some computer systems are now capable of producing photo-realistic and high frame-rate fluid graphics in real-time.

Developers can leverage the power of GPUs when developing user interfaces for operating-system level applications as well as user-level applications. One approach to rendering user interfaces is to provide a user interface framework that logically separates application functions from graphics rendering functions. A first task, for instance, can handle potentially unbounded application functions (e.g., user interface layout tasks, executing application code, handling network communications, performing complex calculations), while a second task can execute largely bounded rendering functions (e.g., executing a rendering pipeline and otherwise preparing GPU data structures for processing by one or more GPUs).

FIG. 1, for example, illustrates an example computer architecture 100 that facilitates the rendering of user interfaces through use of a UI thread and a composition thread. Referring to FIG. 1, computer architecture 100 includes a UI thread 102, a composition thread 112, and a GPU thread 122. While described herein as "threads," one will appreciate that the UI thread 102, the composition thread 112, and/or the GPU thread 122 may comprises tasks, processes, or any other unit of programmatic or logical separation.

The UI (or application) thread 102 is configured to maintain a user interface hierarchy 106 for a user interface of a program 104 (e.g., an operating system-level program or an end-user application program) making use of the UI thread 102. The UI thread 102 can either generate the user interface hierarchy 106 itself, or it can receive all or part of the user interface hierarchy 106 from elsewhere. For instance, the interface hierarchy 106 may be generated based on the execution of programmatic code that generates the user interface, and/or based on the parsing of markup that represents the user interface (e.g., Extensible Application Markup Language (XAML)). The user interface hierarchy 106 can be configured to represent elements of the user interface, such as UI controls (e.g., buttons, list boxes, grids, text boxes, etc.), images, vector graphics, videos, animations that modify the user interface over time, etc. using any appropriate data structure (e.g., a tree structure). The UI thread 102 can be further configured to enable interaction with the user interface through modifications to the user interface hierarchy 106 and though the execution of application code in response to user interface events (e.g., user input interacting with the user interface, such as touch input (i.e., touch gestures), pointing device input, and/or keyboard input; receipt of data; receipt of signals from other processes; and the like).

The UI thread 102 is also configured to occasionally walk the user interface hierarchy 106 to generate composition information for the user interface (e.g., during each execution of the UI thread 102, at defined intervals, in response to changes in the user interface hierarchy 106). For instance, during or in response to the UI thread 102 walking the user interface hierarchy 106, the UI thread 102 can convert user interface elements represented in the hierarchy, into one or more composition structures 108 that describe the user interface elements. In some embodiments, the composition structures 108 can describe the user interface elements of a scene as a plurality of polygons. Thus, the composition structures 108 can include information describing vertices of polygons, textures, colors, gradients, lighting information, masks applied to the polygons, and/or clipping information, etc. Based on the composition structures 108, the UI thread 102 can be configured to occasionally send composition data 110 to the composition thread 112 for further processing by the composition thread 112 in preparation for rendering by a GPU 124 at the GPU thread 122. The composition data 110 can include initial composition structures 108 for the user interface hierarchy 106, and/or updates to the composition structures 108 resulting from changes in the user interface hierarchy 106.

The composition thread 112 is configured to receive the composition data 110, and to "compose" the composition data 110 into GPU primitives (i.e., the illustrated GPU data structures 118) which can be processed/rendered by the GPU 124. As shown, the composition thread 112 is configured to maintain a composition hierarchy 114 which substantially mirrors the user interface hierarchy 106 in the form of composition data 110 from the composition structures 108. Each time the composition thread 112 thread executes, it is configured to walk the composition hierarchy 114, gathering composition data as it does so, and to feed the gathered composition data into a rendering pipeline 116. The rendering pipeline 116, in turn, composes the gathered composition data into GPU data structures 118 (e.g., vertex buffers, index buffers, textures, shaders, and the like). Based on the newly generated GPU data structures 118, the composition thread 112 is configured to send GPU data and commands 120 to the GPU thread 112, which in turn renders a user interface scene represented by the GPU data structures 118 at the GPU 124 and populates a frame buffer 126.

The rendering pipeline 116 can comprise a series of programmable and/or non-programmable components that generate the GPU data structures 118. For example, the rendering pipeline 116 may include combinations of shaders (e.g., vertex, pixel, geometry), rasterizers, blenders, etc. The rendering pipeline can receive as input the compositional data (e.g., vertex data) from the composition hierarchy 114, and pass the composition data through each of the pipeline components, to generate the GPU data structures 118. The conversion can including applying one or more transforms (e.g., model, camera, perspective) to vertex data to position polygon(s) within a 2-D or 3-D space; mapping textures, colors, gradients, etc. to the vertex data; as well as any other appropriate task.

As such, each time the composition thread 112 executes, it is configured to generate new GPU data structures representing the scene of a single video frame, and to pass this data to the GPU thread 122 to render the frame. The composition thread 112 therefore typically executes at a frequency equivalent to the desired output frame rate for displaying user interface (e.g., 60 fps). The workload of the composition thread 112 is relatively bounded and predictable, so it can generally achieve the desired frame rate, given sufficient computing resources. The UI thread 102, on the other hand, can execute less frequently and/or handle more unbounded tasks.

Computer architecture 100 renders complicated user interfaces well on relatively powerful computing systems. However, the composition thread 112 does a great deal of work during each execution, including walking the composition hierarchy 114 and generating new GPU data structures 118 through execution of the rendering pipeline 116 each time it runs. Furthermore, the composition thread 112 stores a good deal of largely duplicative data in its composition hierarchy 114, which can be exasperated when rendering complex user interfaces that have a large number of elements or when employing any form of caching. In the context of computer systems (e.g., portable devices) that have more limited resources (e.g., memory and processing resources), the composition thread 112 may be unable to perform this processing fast enough to execute at a desirable frame rate, resulting in reduced quality of the rendered user interface, or it may have insufficient memory resources to maintain the composition hierarchy 114.

Figure 2:
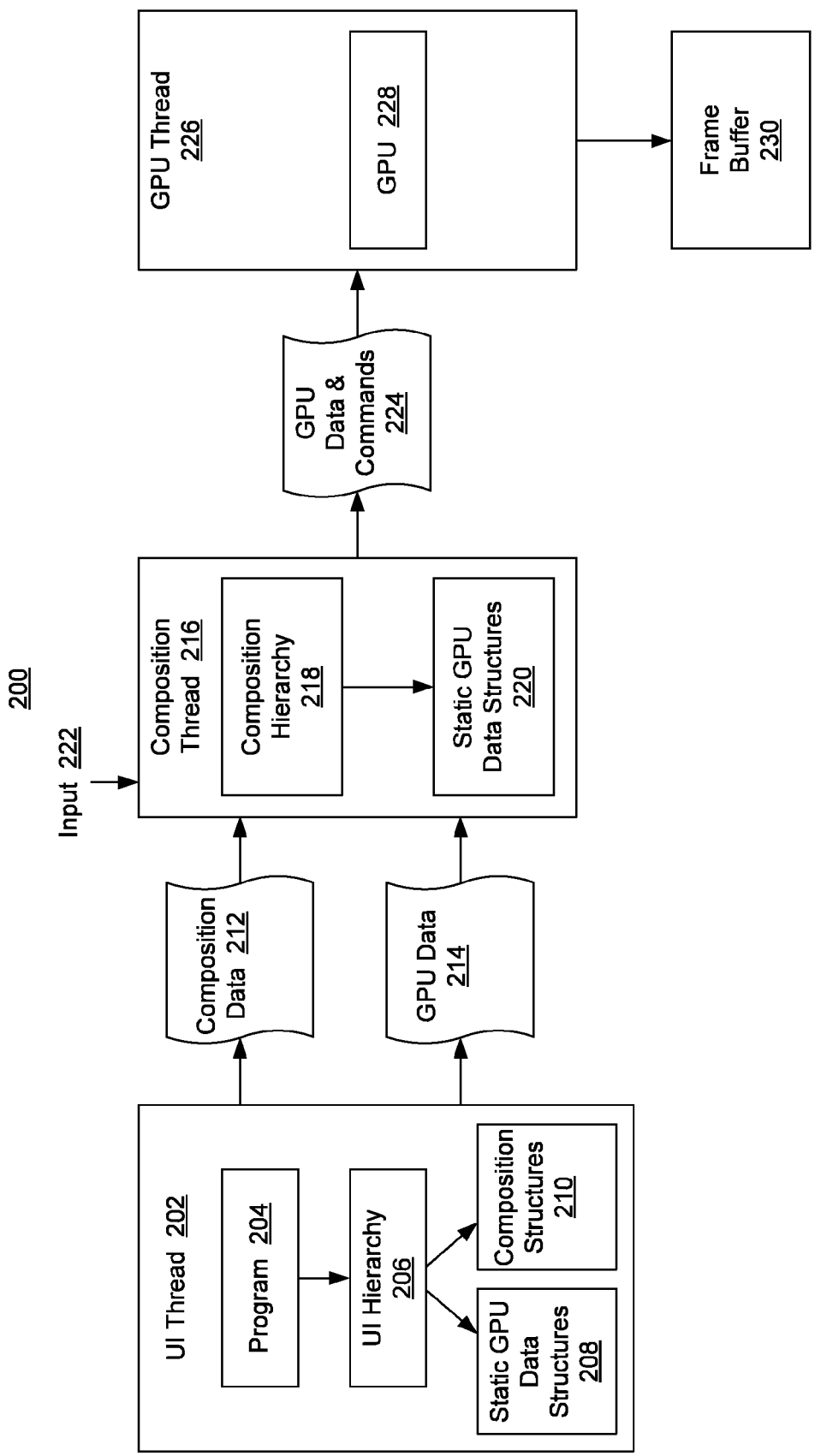
FIG. 2 illustrates an example computer architecture that uses primitive composition at a user interface thread to render a user interface.

As such, FIG. 2 illustrates an embodiment of an alternative computer architecture 200 that employs primitive composition at the UI thread to render a user interface. Referring to FIG. 2, computer architecture 200 includes a UI thread 202, a composition thread 216, and a GPU thread 226. Similar to computer architecture 100 of FIG. 1, these "threads" may comprise tasks, processes, or any other unit of programmatic or logical separation.

Similar to the UI thread 102 of FIG. 1, the UI thread 202 is configured to maintain a user interface hierarchy 206 for a user interface of a program 204 (e.g., an operating system or end-user application) making use of the UI thread 202. The user interface hierarchy 206 can represent elements of the user interface, such as UI controls (e.g., buttons, list boxes, grids, text boxes, etc.), images, vector graphics, videos, animations that modify user interface elements over time, etc., and can be generated by UI thread 202 (e.g., by parsing XAML) or received from elsewhere. The UI thread 202 can also be configured to enable interaction with the user interface by modifying the user interface hierarchy 206 and by executing program 204 code in response to user interface events (e.g., user input events, network events, data processing events, etc.).

Unlike the UI thread 102 of FIG. 1, however, the UI thread 202 is configured to directly generate static GPU data structures 208 as a result of walking the user interface hierarchy 206. That is, the UI thread 202 (instead of the composition thread 216) is configured to generate or compose GPU primitives (e.g., vertex buffers, index buffers, textures, shaders, etc.) that can be processed/rendered by the GPU 228. Unlike the GPU data structures 118 generated by the composition thread 112 of FIG. 1, which are newly generated each time the thread executes, the UI thread 202 is configured to generate static GPU data structures 208 which can be used for rendering multiple frames with little or no modification. Thus, in the context of computer architecture 200, "static" means that at least some of the GPU data structures 208 are re-used in rendering multiple frames, instead of being newly generated for each frame. Generating "static" GPU structures at the UI thread 102 results in generation of far less GPU data than would be generated by the composition thread 112 of FIG. 1.

The UI thread 202 can be configured to employ one or more optimizations when generating the static GPU data structures 208. For instance, the UI thread 202 can be configured to generate GPU data structures corresponding to static user interface elements, which remain substantially unchanged from frame to frame. Thus, the UI thread 202 may only generate new static GPU data structures 208 when corresponding user interface elements change. Furthermore, the UI thread 202 can be configured to limit the types of user interface elements that are available for use, and can be configured to use functions that are optimized to generate GPU data structures for these interface particular types elements. In one or more embodiments, for example, a significant number of user interface elements of program 204 can be based on particular types of user interface primitives (e.g., circles, rectangles, arcs), and the UI thread 202 can include optimized functions for converting these user interface primitives into GPU primitives. So configured, the UI thread 202 can largely, or even completely, eliminate the need for and use of a generic rendering pipeline (e.g., rendering pipeline 116 of computer architecture 100).

As shown, the UI thread 202 is configured to pass the static GPU data structures 208 as GPU data 214 to the composition thread 216 which, in turn, is configured to maintain static GPU data structures 220. As discussed, the composition thread 216 is configured to retain at least some of the static GPU data structures 220 for use in generating multiple frames. As such, if the user interface remains relatively static from frame to frame, which may occur relatively commonly in many user interface scenarios, the composition thread 216 may only instruct the GPU thread 226 to render the static GPU data structures 220 with the GPU 228 (e.g., with GPU data and commands 224), and can do so for multiple frames using the same static GPU data structures 220.

The UI thread 202 may also be configured to generate composition structures 210 from the user interface hierarchy 206. If generated, these composition structures 210 may describe animations to apply to user interface elements represented by the static GPU data structures 208. As such, the UI thread 202 may also be configured to pass any generated composition structures 210 as composition data 212 to the composition thread 216, and the composition thread 216 may be configured to maintain a composition hierarchy 218. However, the composition hierarchy 218 in computer architecture 200 can potentially maintain far less composition information than the composition hierarchy 114 of computer architecture 100. For example, the composition hierarchy 218 may maintain only composition information related to the animation applied to the static GPU data structures 220. The composition thread 216 can then be configured to use the animation information in the composition hierarchy 218 to modify portions of the static GPU data structures 220 so that (as opposed generating new structures), when rendered by the GPU 228, any corresponding user interface elements are animated from frame to frame.

Furthermore, the composition thread 216 can also be configured to receive input 222, such as user input. The input 222 can comprise any arbitrary form of input, such as touch input (gestures), pointing device input, network input, camera input, sensor device input (e.g., compass, GPS, accelerometer, gyroscope, thermometer, light sensor), microphone input, etc. When the input 222 would result in the animation of any user interface elements represented by the static GPU data structures 220, the composition thread 216 can be configured to, itself, initiate animation of the user interface elements. As such, the composition thread 216 can create and/or modify animation information in the composition hierarchy 218 independent of composition data from the UI thread 202, and can cause user interface elements represented by the static GPU data structures 220 to be animated. For example, the composition thread 216 can be configured to modify portions of the static GPU data structures 220 (e.g., by modifying GPU data that alters the position, scaling, rotation, transparency, clipping, color, perspective, opacity, model transform, and/or orientation of corresponding user interface elements) based on the input so that, when rendered by the GPU 228, the corresponding user interface elements are animated from frame to frame.

The configuration of computer architecture 200, therefore simplifies the composition thread 216, by eliminating all or part of the rendering pipeline, and by removing much (or even all) of the composition hierarchy 218. Thus, the composition thread 216 can consume far fewer memory and processing resources during each execution. In particular, the composition thread 216 no longer stores and walks a composition hierarchy 218 that is largely duplicative, and the composition thread 216 no longer generates new GPU data structures with each execution. As such, even in computer systems having limited resources, the composition thread 216 can execute frequently (e.g., at 60 fps) to feed GPU data and commands 224 for each frame to the GPU thread 226 for rendering. In the most simple execution scenarios, such as those where the user interface does not change from frame to frame, the composition thread can directly leverage the static GPU data structures 240 to send the GPU data and commands. In other words, the composition thread can supply the GPU thread 226 with GPU data and "say go." In a more complicated execution scenarios, in which user input has been received or in which the composition thread 216 needs to process animation data, the composition thread 216 can process input and/or modify one or more of the composition hierarchy 218 or the static GPU data structures 220 to animate user interface elements. In either case, by handling a small set of bounded tasks, the composition thread 216 can ensure that the user interface is drawn at a consistently high frame rate, and the user interface is responsive to input, even with very limited resources.

The UI thread 202, on the other hand, can execute far less frequently than the composition thread 216, and/or can take additional time when executing to handle unbounded tasks (e.g., user interface layout tasks, network tasks, data-binding tasks, rasterization, tessellation, or other complex calculations). The UI thread 202 can update the static GPU structures as needed 208, but since the static GPU structures 208 correspond to largely static user interface elements, these updates may occur relatively infrequently in many user interface scenarios. Thus, both the cost of generating GPU primitives and the cost of transferring data to the composition thread 216 are both substantially reduced when compared to computer architecture 100. Thus, overall, computer architecture 200 can render a user interface while generating a minimal amount of GPU data and is optimized for devices having limited resources.

Figure 3:
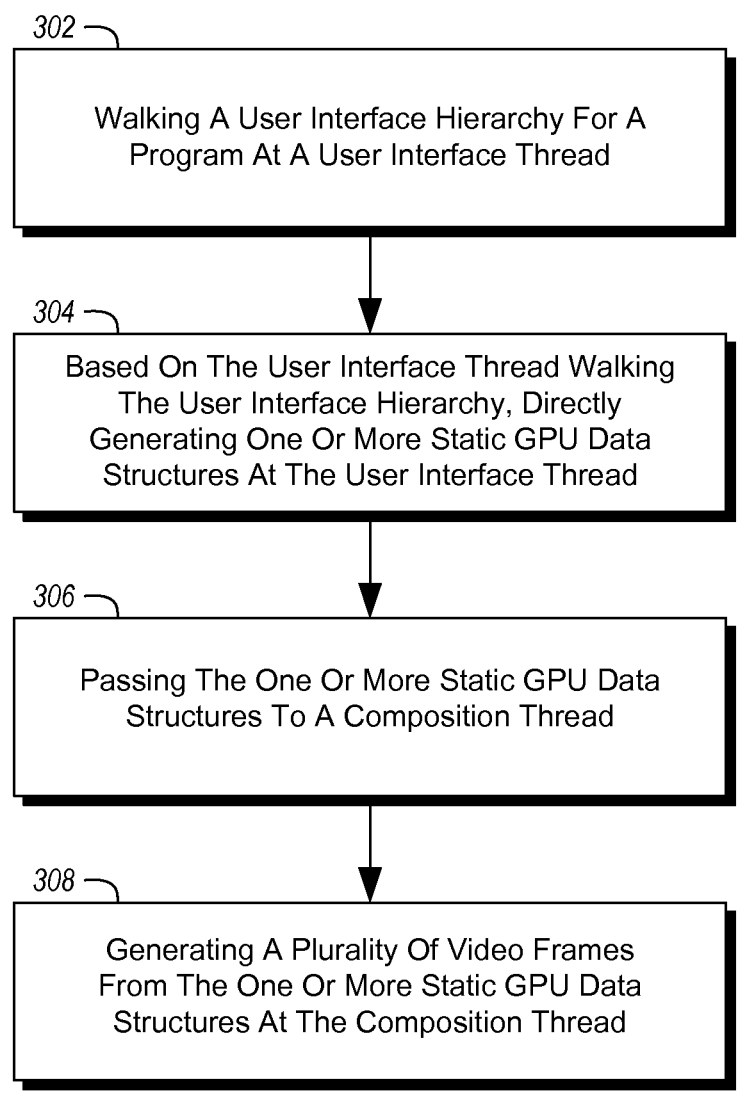
FIG. 3 illustrates a flow chart of an example method for using primitive composition to render a user interface for a program.

FIG. 3 illustrates a flow chart of an example method 300 for using primitive composition to render a user interface for a program. Method 300 will be described with respect to the components and data of computer architecture 200.

The method 300 includes an act of walking a user interface hierarchy for a program at a user interface thread (act 302). Act 302 can comprise an act of a UI thread walking a user interface hierarchy for a program, the user interface hierarchy describing one or more user interface elements of a user interface of the program. For example, the UI thread 202, which is hosting or being utilized by program 204, can walk the user interface hierarchy 206. The user interface hierarchy 206 can store information in a data structure (e.g., a tree structure) which represents user interface elements of a user interface for the program 204.

The method 300 also includes an act of, based on the user interface thread walking the user interface hierarchy, directly generating one or more static GPU data structures at the user interface thread (act 304). Act 304 can comprise, based on the UI thread walking the user interface hierarchy, an act of the UI thread directly generating one or more static GPU data structures representing at least a portion of the user interface hierarchy. For example, the UI thread 202 can directly generate the static GPU data structures 208. These GPU structures can correspond, in some instances, to user interface elements that remain substantially static from frame to frame. Even when some of user interface elements are animated, they may still be represented in the static GPU structures 208, because the composition thread 216 can later animate them. As GPU data, the static GPU data structures 208 can comprise, for example, one or more vertex buffers, index buffers, textures, shaders, and the like.

In addition, the method 300 also includes an act of passing the one or more static GPU data structures to a composition thread (act 306). Act 306 can comprise an act of the UI thread passing the one or more static GPU data structures to a composition thread, the composition thread retaining the one or more static GPU data structures for reuse during the generation of a plurality of video frames corresponding to the user interface. For example, the UI thread 202 can pass GPU data 214 that is equivalent to or derived from the static GPU data structures 208 to the composition thread 216. The composition thread 216 can, in turn, store the received GPU data 214 as static GPU data structures 220, and can retain this information across multiple executions of the composition thread 216 to leverage the same static GPU data structures 220 for generating a plurality of video frames.

Along these lines, the method 300 also includes an act of generating a plurality of video frames from the one or more static GPU data structures at the composition thread (act 308). Act 308 can comprise an act of the composition thread generating the plurality of video frames corresponding to the user interface, including the composition thread sending GPU data and GPU commands derived from the one or more static GPU data structures to the GPU for each of the plurality of video frames, such that the composition thread reuses the one or more static GPU data structures received from the UI thread when rendering the plurality of video frames corresponding to the user interface. For example, based on the static GPU data structures 220, the composition thread 216 can send GPU data and commands 224 to the GPU 228 for rendering. In one or more embodiments, the composition thread 216 can send GPU data and commands 224 for one or more video frames with each execution of the composition thread 216, and retain the GPU data structures 220 across multiple executions. Thus, the composition thread 216 can leverage the same static GPU data structures 220 when generating multiple video frames.

Although not shown, the method 300 may also include an act of the UI thread 202 generating composition structures 210 corresponding to animations of the user interface, and passing composition data 212 to the composition thread 216. Thus, the composition thread 216 can store a composition hierarchy 218 which may include the composition data 212, which describes one or more animations of the user interface. As such, prior to sending GPU data and commands 224 to the GPU 228, the composition thread 216 can modify the static GPU data structures 220 to bring about animations of corresponding user interface elements when rendered. For instance, the composition thread 216 can modify information in the GPU data structures 220 that would bring about a change in one or more of position, scaling, rotation, transparency, clipping, color, perspective, opacity, model transform, or orientation of the corresponding user interface element. Also, while the composition thread 216 can modify the static GPU data structures 220 in response to composition data 212 received from the UI thread 202, the composition thread 216 can also initiate animations itself, in response to user input 222.

While carrying out the method 300, the UI thread 202 may perform some unbounded tasks (e.g., user interface layout tasks, network tasks, data binding tasks, rasterization, tessellation, other complex calculations), while the composition thread 216 may perform only bounded tasks. As such, the UI thread 202 may operate according to a first schedule, which may be relatively less frequent when compared to a second schedule with which the composition thread 216 operates, and/or the UI thread 202 may, at times, take relatively long amounts of time to execute. As such, the composition thread 216 can ensure that the user interface is consistent presented at high frame rates, and that the user interface remains responsive to user input.

Accordingly, embodiments described herein extend to methods, systems, and computer program products for performing primitive composition within a user interface thread, enhancing the ability to scale a user interface framework to computing devices having limited resources. By directly generating static GPU data structures at the UI thread that can be used in generating a plurality of video frames, the workload on a composition thread is reduced, enabling it to reliably execute a high frame rate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a graphics processing unit (GPU), a method for using primitive composition to render a user interface for a program, the method comprising:

a user interface (UI) thread walking a user interface hierarchy for the program, the user interface hierarchy describing one or more user interface elements of a user interface of the program;

based on the UI thread walking the user interface hierarchy, the UI thread directly generating one or more static GPU data structures representing at least a portion of the user interface hierarchy;

the UI thread passing the one or more static GPU data structures to a composition thread, the composition thread storing the one or more static GPU data structures such that the one or more static GPU data structures can be reused during the generation of a plurality of video frames corresponding to the user interface; and the composition thread generating the plurality of video frames corresponding to the user interface, including the composition thread sending GPU data and GPU commands derived from the one or more static GPU data structures to the GPU for each of the plurality of video frames, such that, during multiple executions of the composition thread, the composition thread reuses when rendering the plurality of video frames corresponding to the user interface the one or more static GPU data structures received from the UI thread.

2. The method as recited in claim 1, further comprising:
an act of the UI thread passing to the composition thread user interface information relating to one or more animations of the user interface;
an act of the composition thread maintaining one or more composition data structures that describe the one or more animations of the user interface; and
prior to sending the GPU data and the GPU commands to the GPU, an act of the composition thread modifying at least one of the one or more static GPU data structures based on the one or more animations, thereby causing the GPU to process a portion of the at least one static GPU data structure differently to apply the one or more animations to at least one corresponding user interface element.

3. The method as recited in claim 2, wherein causing the GPU to process a portion of the at least one static GPU data structure differently comprises causing the GPU to modify one or more properties of the corresponding user interface element, including modifying one or more of position, scaling, rotation, transparency, clipping, color, perspective, opacity, model transform, or orientation of the corresponding user interface element.

4. The method as recited in claim 2, wherein the one or more animations comprise an animation of the corresponding user interface element responsive to user input.

5. The method as recited in claim 1, further comprising:
an act of the composition thread receiving information indicating that input has been received at the user interface; and
in response, an act of the composition thread directly modifying at least one of the one or more static GPU data structures.

6. The method as recited in claim 5, wherein the act of the composition thread directly modifying at least one of the one or more static GPU data structures comprises an act of the composition thread directly modifying the at least one static GPU data structure to initiate an animation to a corresponding user interface element affected by the input.

7. The method as recited in claim 5, wherein the input comprises one or more of a touch gesture, pointing device input, network input, camera input, sensor device input, or microphone input.

8. The method as recited in claim 1, wherein the one or more static GPU data structures correspond to one or more static user interface elements of the user interface that remain substantially unchanged from frame to frame.

9. The method as recited in claim 1, wherein the one or more static GPU data structures directly generated by the UI thread comprise one or more of a vertex buffer, an index buffer, a texture, or a shader.

10. The method as recited in claim 1, wherein the act of the UI thread directly generating one or more static GPU data structures comprises an act of the UI thread performing one or more unbounded tasks to generate the one or more static GPU data structures.

11. The method as recited in claim 10, wherein the one or more unbounded tasks comprise one or more of a user interface layout task, a network task, a data-binding task, or a complex calculation.

12. The method as recited in claim 1, wherein the composition thread is configured to perform only bounded tasks.

13. The method as recited in claim 1, wherein the UI thread operates to modify and/or generate the one or more static GPU structures according to a first schedule, and wherein the composition thread operates to modify and/or submit the one or more static GPU structures to the GPU according to a second schedule that is different from the first schedule.

14. The method as recited in claim 13, wherein the second schedule causes the composition thread to operate more frequently than the first schedule causes the UI thread to operate.

15. A computer program product for use at a computer system that includes a graphics processing unit (GPU), the computer program product for implementing a method for using primitive composition at a user interface (UI) thread to render a user interface of a program, the computer program product comprising one or more computer storage media having stored thereon computer-executable instructions that, when executed at a processor, cause the computer system to perform the method, including the following:

walk a user interface hierarchy for the program with a UI thread, the user interface hierarchy describing one or more user interface elements of a user interface of the program;

generate directly with the UI thread one or more static GPU data structures representing at least a portion of the user interface hierarchy;

pass the one or more static GPU data structures from the UI thread to a composition thread, the composition thread storing the one or more static GPU data structures such that the one or more static GPU data structures can be reused during the generation of a plurality of video frames corresponding to the user interface; and generate the plurality of video frames corresponding to the user interface, including the composition thread sending GPU data and GPU commands derived from the one or more static GPU data structures to the GPU for rendering each of the plurality of video frames, such that, during multiple executions of the composition thread, the composition thread reuses when sending GPU data and GPU commands for the plurality of video frames the one or more static GPU data structures.

16. The computer program product as recited in claim 15, further comprising computer-executable instructions that, when executed at the processor, cause the composition thread to:

maintain one or more composition data structures relating to one or more animations of user interface elements of the user interface; and prior to sending the GPU data and the GPU commands to the GPU, modify at least one of the one or more static GPU data structures based on the one or more animations, thereby causing the GPU to process a portion of the at least one static GPU data structure differently to apply the one or more animations to at least one corresponding user interface element.

17. The computer program product as recited in claim 16, wherein the composition thread maintains the one or more composition data structures based on composition information passed from the UI thread.

18. The computer program product as recited in claim 16, wherein the composition thread maintains the one or more composition data structures based on user input received at the composition thread.

19. The computer program product as recited in claim 18, wherein the composition thread initiates the one or more animations in response to the user input received at the composition thread.

20. A computer system, comprising:
one or more processors;
a graphics processing unit (GPU);
system memory; and
one or more computer storage media having stored thereon computer executable instructions, which when executed implement a plurality of threads, including:
a user interface thread, which is configured to:
maintain a user interface hierarchy that describes one or more user interface elements of a user interface of a program,
walk the user interface hierarchy to directly generate one or more static GPU data structures representing at least a portion of the user interface hierarchy, including at least one static GPU data structure corresponding to a user interface element that remains unchanged from frame to frame when rendering the user interface, and
pass the one or more static GPU data structures to a composition thread;
the composition thread, which is configured to:
store the one or more static GPU data structures such that the one or more static GPU data structures can be reused during multiple executions of the composition thread, such that the one or more static GPU data structures are used in generating a plurality of video frames rendered during separate executions of the composition thread, and
for each execution of the composition thread, send GPU data and GPU commands for at least one video frame to a GPU thread for rendering, the GPU data and GPU commands derived from the one or more static GPU data structures; and
the GPU thread, which is configured to receive GPU data and GPU commands from the composition thread and to render graphics data at the GPU based on the GPU data and GPU commands.

\* \* \* \* \*